United States Patent
Aubineau et al.

(10) Patent No.: US 11,741,313 B2
(45) Date of Patent: Aug. 29, 2023

(54) QUESTION BASED CHATBOT GENERATOR FROM WEB API SPECIFICATIONS

(71) Applicant: International Business Machines Corporation, Armonk, NY (US)

(72) Inventors: Eric Aubineau, Fontainebleau (FR); Hugues Citeau, Longeville sur mer (FR)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 17/169,711

(22) Filed: Feb. 8, 2021

(65) Prior Publication Data
US 2022/0253607 A1    Aug. 11, 2022

(51) Int. Cl.
*G06F 40/35* (2020.01)
*G06N 5/04* (2023.01)
*G06F 40/279* (2020.01)
*G06F 40/169* (2020.01)
*H04L 51/02* (2022.01)

(52) U.S. Cl.
CPC ............ *G06F 40/35* (2020.01); *G06F 40/169* (2020.01); *G06F 40/279* (2020.01); *G06N 5/04* (2013.01); *H04L 51/02* (2013.01)

(58) Field of Classification Search
None
See application file for complete search history.

(56) References Cited

U.S. PATENT DOCUMENTS

| 10,388,285 | B2 * | 8/2019 | Hirzel | G06F 8/35 |
| 10,679,631 | B2 | 6/2020 | Hirzel | |
| 11,474,836 | B2 * | 10/2022 | Awadallah | G06N 20/00 |

(Continued)

OTHER PUBLICATIONS

Duckling library. Web page found at https://github.com/facebook/duckling on Feb. 4, 2021.
(Continued)

*Primary Examiner* — Isaac Tuku Tecklu
(74) *Attorney, Agent, or Firm* — Jeffrey S LaBaw; David Mattheis; Feb R Cabrasawan

(57) ABSTRACT

A method, apparatus and computer program product for creating and operating a conversational system are described. A user annotated Web API specification is received which includes a set of user annotations The user annotated Web API specification is analyzed to produce an action catalog. The action catalog includes a set of sentences, each sentence describing a respective Web API call. The user annotated Web API specification is also analyzed to produce a rule set, each rule in the rule set has a rule condition which corresponds to an input in the user annotated Web API specification. The action catalog and the rule set are provided to the conversational system. The conversational system uses a question answering (QA) system as a natural language understanding (NLU) component. When the conversational system receives a user input during a dialog between a user and the conversational system, the user input is interpreted by the question answering (QA) system to identify an action from an action catalog. The identified action is set as a goal for a goal-based reasoning engine. A response is issued to the user based on the identified action and results from the goal-based reasoning engine.

20 Claims, 6 Drawing Sheets

(56) References Cited

U.S. PATENT DOCUMENTS

| | | | | |
|---|---|---|---|---|
| 2019/0066694 A1* | 2/2019 | Hirzel | .................. | G06F 8/30 |
| 2019/0197111 A1* | 6/2019 | Garrote | .................. | G06F 40/30 |
| 2020/0034737 A1* | 1/2020 | Munro | .................. | G06F 40/169 |
| 2020/0042642 A1* | 2/2020 | Bakis | .................. | G06F 40/35 |
| 2020/0042649 A1* | 2/2020 | Bakis | .................. | H04L 51/02 |
| 2020/0285528 A1* | 9/2020 | Olsen | .................. | G06F 40/205 |

OTHER PUBLICATIONS

"Follow-up Question Generation", Mandasari, Thesis, Faculty of Elecliical Engineering, Mathematics and Computer Science, University of Twente, Enschede, The Netherlands, Aug. 2019.

\* cited by examiner

| | | |
|---|---|---|
| USER: | CAN YOU VALIDATE A 100000$ LOAN FOR JOHN SMITH? | ~ 503 |
| SYSTEM: | HOW MANY MONTHS DOES THE LOAN LAST? | ~ 505 |
| USER: | 240 | |
| SYSTEM: | READY TO VALIDATE LOAN?<br><br>NAME:     JOHN SMITH<br>AMOUNT:  100000<br>DURATION: 240<br><br>IF SOME VALUES ARE WRONG OR MISSING CHANGE VALUES | ~ 507 |
| USER: | YES | |
| SYSTEM: | THIS LOAN IS VALIDATED (MONTHLY REPAYMENT IS 550$) | ~ 509 |

QUESTION BASED CHATBOT GENERATOR FROM WEB API SPECIFICATIONS

BACKGROUND OF THE INVENTION

This disclosure relates generally to conversational systems such as chatbots and virtual agents. More particularly, it relates to a generating a conversational system which makes calls to a Web API specification using a question based application as a component of the conversational system.

It is becoming common for users to encounter applications such as virtual agents and chat bots which provide a natural language interface to web content, apps and channels. Typically, these applications, called generally "conversational systems", use natural language based dialog prompts and responses to interact with end users for fulfilling goal-oriented tasks such as on-line transactions. While such applications offer great potential value, the development of such applications is limited by the difficulty in generating an interface to the user.

As developing the conversational system application is difficult, many chatbot platforms such as Watson Assistant exist today to help create a chatbot application that can conduct a conversation with a user. The architecture of a typical platforms is based on two components: a natural language understanding (NLU) component that understands the user request and a dialog driver that replies to the user. NLU is a subset of natural language processing (NLP). An NLU component allows direct human-computer interaction since human languages can be understood statically by the computer without the special coding. The dialog driver prepares the system response to a user input in a natural language.

To create a chatbot with those platforms the designer must configure the NLU component to detect user intent and entities from user requests. Also, the designer must define the dialog driver as a flowchart that takes the user intent and detected entities in the user input to perform a suitable action or to request missing information. While aided by the utilities provided by the platforms, these are technical and difficult tasks.

Therefore, further improvements in preparing such human interfaces are needed.

BRIEF SUMMARY

According to this disclosure, a method, apparatus and computer program product for creating and operating a conversational system, a user annotated Web API specification is received which includes a set of user annotations The user annotated Web API specification is analyzed to produce an action catalog. The action catalog includes a set of sentences, each sentence describing a respective Web API call. The user annotated Web API specification is also analyzed to produce a rule set, each rule in the rule set has a rule condition which corresponds to an input in the user annotated Web API specification. The action catalog and the rule set are provided to the conversational system. The conversational system uses a question answering (QA) system as a natural language understanding (NLU) component. When the conversational system receives a user input during a dialog between a user and the conversational system, the user input is interpreted by the question answering (QA) system to identify an action from an action catalog. The identified action is set as a goal for a goal-based reasoning engine. A response is issued to the user based on the identified action and results from the goal-based reasoning engine.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 3 illustrates a high level flow chart of an exemplary configuration process in an embodiment of the invention;

FIG. 5 illustrates a sample dialog between a user and the conversational system according to an embodiment of the invention.

DETAILED DESCRIPTION OF AN ILLUSTRATIVE EMBODIMENT

At a high level, the invention provides a method, system, and computer program product for automating the creation of the chatbot from a user annotated specification. Embodiments of the invention use a question and answer system as the natural language understanding (NLU) component. In embodiments of the invention, rather than ask a user to understand and identity user intent and entities, the user is asked to annotate the specification with a set of natural language questions and descriptions. In addition to using a question answering system as the NLU, embodiments of the invention use a goal-based reasoning engine able to ask questions as a dialog driver.

This invention brings several advantages over existing system. Embodiments are easier to setup than those in the prior art. The requirement to annotate a Web API specification with simpler information (questions and description) is easier that defining entities and user intent in the training set of questions. Arguably, this setup requires little to no technical skill enabling a wider range of users to create a chatbot. Further, chatbots created according to embodiments of the invention offer better user experience. Inputs are better extracted from user request and thus limits the number of questions asked to the chatbot user.

The embodiments will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Figure 1:
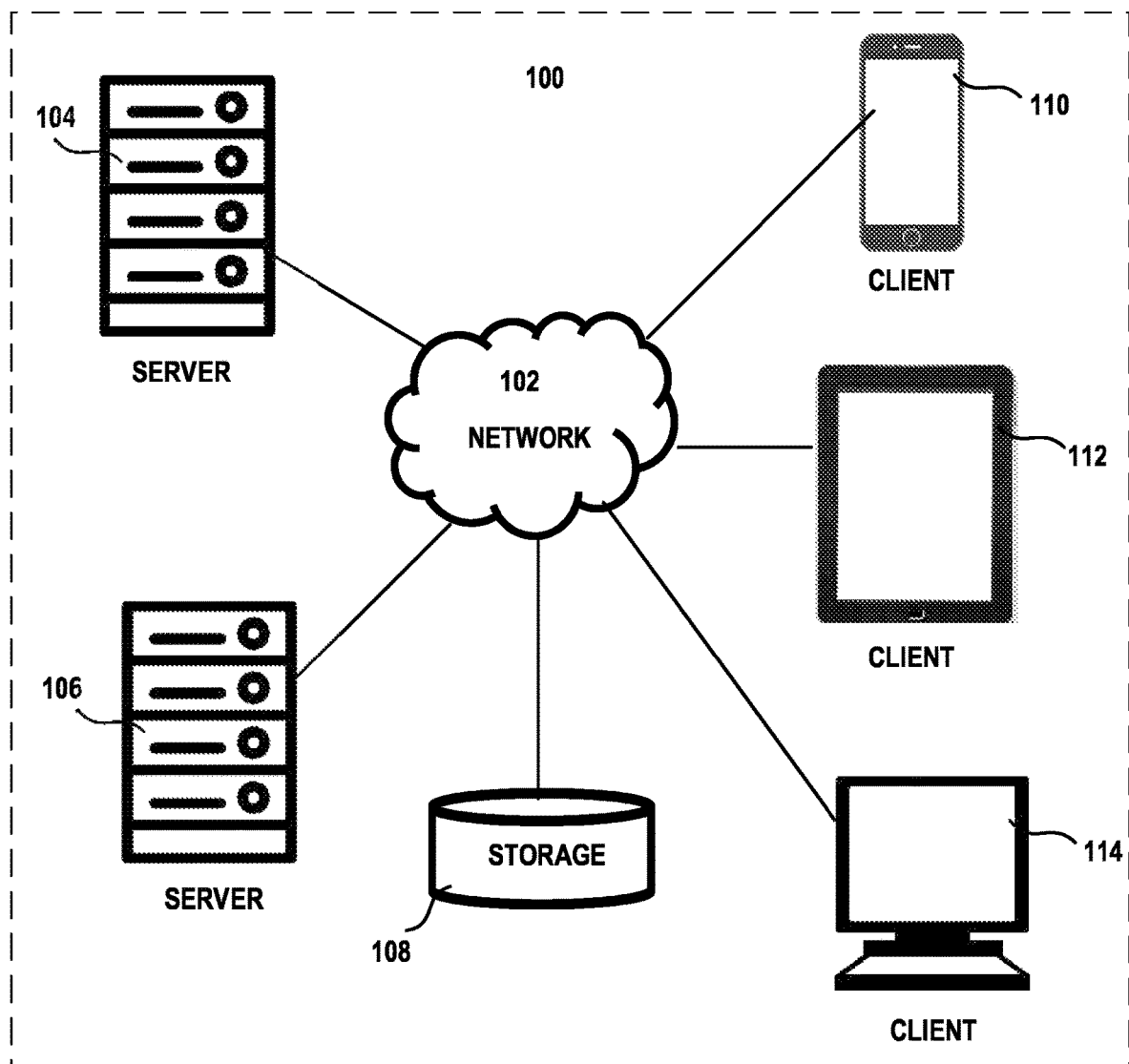
FIG. 1 depicts an exemplary block diagram of a distributed data processing environment in which exemplary aspects of the illustrative embodiments may be implemented.
Figure 2:
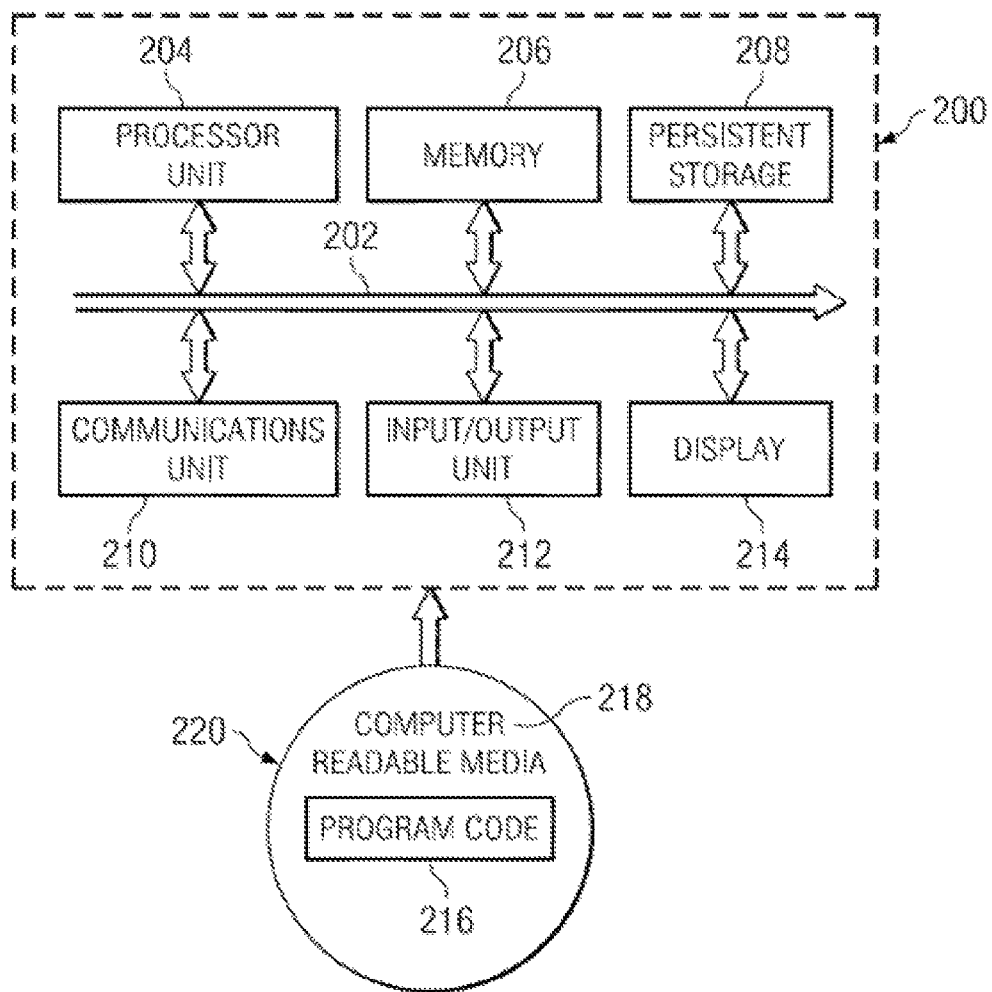
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. The mainframe computer can be, for example, an IBM System z mainframe running the IBM z/OS™ operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

In embodiments of the invention, inputs are better extracted from user requests than the prior art, and thus, the number of questions asked to the chatbot user is limited. The user inputs are better extracted from the user request because Question/Answering based NLUs do not need to adhere to a strict naming convention to be able to extract "free text" inputs. For example, if the user request is "can you send email 'Hello!' to john smith?". In the prior art known to the inventors, the two inputs (message='Hello!', sender='john smith') will not be extracted correctly in many cases. The prior art requires that the user follow strict naming convention (input_name followed by input_value) and writes his request using these naming conventions which is less natural and intuitive.

Figure 3:
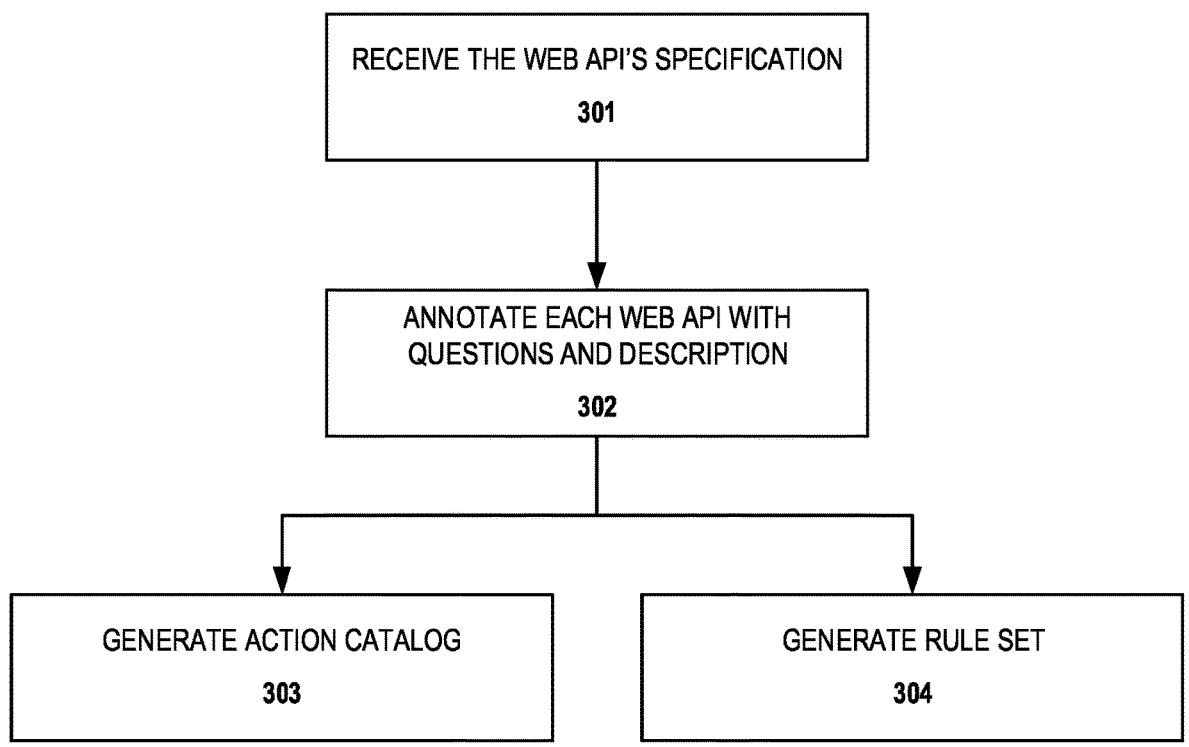
FIG. 3 depicts an exemplary interface for an embodiment of the present invention in which an individual of interest is shown as a portable device is raised.

FIG. 3 illustrates a high level flow chart of an exemplary configuration process in an embodiment of the invention.

In step 301, a Web API specification is received. A Web API specification is typically provided by a Web API provider. A Web API specification defines the APIs needed to call the Web API includes a plurality of parameters, for example, a URL to call, the input values (i.e., the input definition that describes all the information needed to call the API), credentials and so forth. The Web API is typically provided by cloud providers such as IBM, Microsoft or Amazon to use their respective services. In preferred embodiments, a user who sets up the chatbot provides the Web API.

In embodiments of the invention, the Web API specification documents contain a set of Web API parameters that the user intends the chatbot to use to call after the configuration of the chat bot. As is well known, a Web API can be defined using a format as XML, Swagger or JSON.

In step 302, the user annotates the Web API specification (s) for analysis by the system. For each Web API to be used by the chatbot, a human annotates it with a description of the APIs function. The user also annotates each of the needed inputs of Web API with a question that defines how to retrieve this input. Note that in preferred embodiments of the invention these annotations are in a natural language and do not require a great deal of technical skill or knowledge or care that the annotations follow a particular naming convention.

In step 303, the system generates an action catalog from the annotated Web API specification. In the preferred embodiment of the invention, the process to generate the action catalog receives the annotated Web API specification and automatically generates an action catalog. An example of an action catalog is discussed below. In preferred embodiments, the action catalog is a set of sentences where each sentence describes a Web API based on its annotated description.

In step 304, the system receives the annotated Web API specification and automatically generates a rule set. In embodiments of the invention, each rule in the rule set corresponds to a Web API or a portion of the Web API and each rule condition corresponds to an input to the Web API. These rules can be processed at runtime by a goal-based reasoning engine. The reasoning engine of the supporting chat bot can ask user directly about the portions of the Web API for which corresponding annotations are missing or unclear. Alternatively, the goal-based reasoning engine can use the services of the QA system.

In embodiments of the invention, the QA system is not used during the setup process illustrated in FIG. 3. However, the QA system uses the result of the step 303 (the action catalog) at runtime. The setup process is far simpler for the user than in prior art systems, since it just requires that the user annotate the specification with simple information (questions and description). This type of annotation is easier than defining entities and formulating a user intent training set as required by the prior art. These inputs require advanced technical skills.

Figure 4:
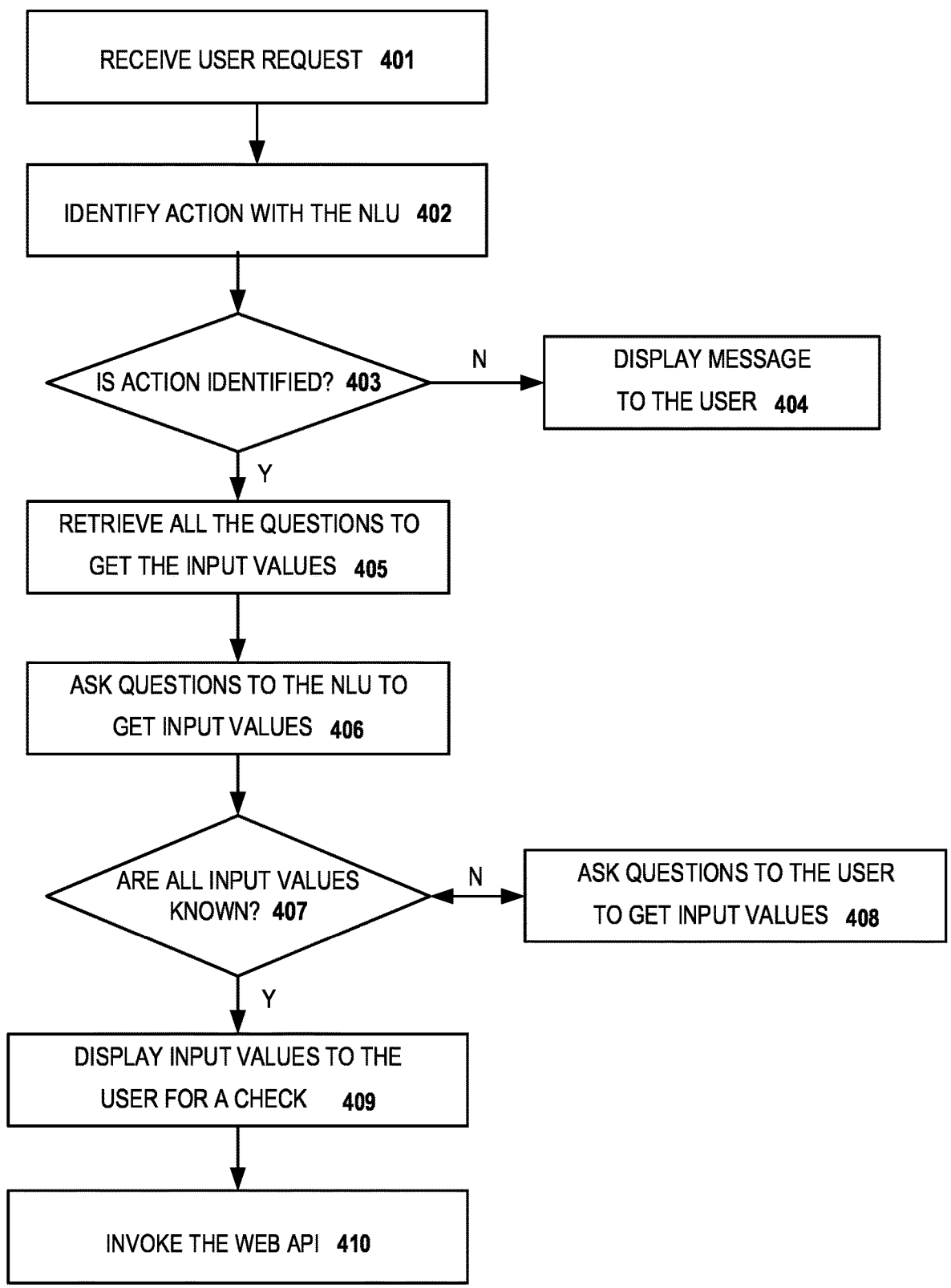
FIG. 4 illustrates a flow chart of an exemplary runtime process in an embodiment of the invention.

FIG. 4 illustrates a flow chart of an exemplary runtime process in an embodiment of the invention.

In step 401, a user request is received by a chatbot created according to the present invention. A typical user request results in calling an action implemented by the Web API. Typically, a user formulates his request by starting with starting phrases not directed to words or commands used by the API, such as "can you". For example: "Can you validate a $100,000 loan for john smith?". However, other words such as "validate", a username and a dollar amount might be the words used by the Web API.

In step 402, the chat bot identifies the action in the Web API that must be called. In this step, an NLU which is a QA system is used. The user request is in a natural language, e.g., text, that the question answering system must understand. The user request is processed by the QA system to identify an action in the action catalog which corresponds to the Web API call. As discussed above, the action catalog is generated at configuration time. The 'text' is a text in a natural language that the QA system understands. In a QA system, the inputs are the 'text' and the 'question', and the output is the 'reply'. The QA system gives the best reply to a given user question according to a given text. In the invention, the text that the question answering system must understand is the action catalog. The question to ask to the question answering system is the user request. In embodiments of the invention, the question received by the chat bot system in the user request can be slightly reformulated before forwarding to the question answering system (so that it is more easily understood) to obtain a better result.

In step 403, the response of the question answering system is analyzed to identify the action and whether the action is identified. Confidence scores can be computed at this point to decide if the candidate response(s) is good enough to be considered for further action, i.e., executing a Web API call. For example, the "action 2" can be identified as the Web API action in the action catalog to call. In step 404, if the action is not identified, the chatbot displays a message indicating that no action can be found that can do the user request. For example: "Sorry, but the request cannot be performed." Alternatively, the chatbot may request that the user rephrase the question or to provide more information which might help the system to find an appropriate action in the action catalog.

In step 405, if the action is identified, a goal that corresponds to the identified action is set as the goal of the goal-based reasoning engine. In preferred embodiments, the reasoning engine then starts a backward chaining reasoning to retrieve answers to all the questions associated with goal to get the input values needed for execution. Backward chaining (or backward reasoning) is an inference method which "works backward" from a defined goal. Backward chaining is used in a variety of artificial intelligence applications. Backward reasoning engines and goal-based reasoning engine are synonyms and well defined in literature. They are inference engines that work in a backward chaining process. In other words, their inference rules are used in a 'backward' way from action to conditions. For example, if a goal-based reasoning engine has 3 rules: A->B, B->C, and C->D and D is set as the reasoning engine goal, the inference engine will use the 3 rules in backward chaining to prompt the user if A is true. If the user replies "yes", the engine would deduce that the goal is reached (D is true)

In step 406, each of the questions from the annotated specification is forwarded to the NLU component, e.g., the QA system. In embodiments of the invention, the text that the question answering system (NLU) must understand is the user request reformulated as a statement in a preferred format.

In step 407, each response of the question answering system is analyzed. The response value may not fit perfectly to the formal input type expected by the goal-based reasoning engine. In these cases, additional processing is requested to fit the value returned by the NLU into the right input type format. This may require requests to the user for additional information. For example, if the input type expected is an enumeration, a Jaro-Winkler distance may be computed to identify the enumeration from the response. Confidence scores can be computed at this point to decide if the response from the QA system is good enough to be considered as an input value.

Step 408 illustrates a case where the system cannot resolve a question on its own. For example, if an input value is still unknown, a question can be issued by the chatbot, for example "how many months does the loan last?", to the user of the chatbot. The user's reply, for example, "240", is considered as an input value and analyzed with the previous inputs to the chatbot system. The reasoning engine will repeat this step until all input values are known.

In step 409, an optional step of displaying the user input as understood by the system is illustrated. As a perfect NLU (using QA system or other chatbot technologies) is difficult to achieve, it is common for errors to occurs in input detection. Thus, it is common for the chatbot to display what it understands the user input to be before execution. Web API calls can perform critical operations, for example, a Web API call can perform a money transfer, it is important that the user can check the input values detected by the NLU before performing the Web API calls. Once all needed input values are known, they can be checked and modified by the user before chatbot actually makes the Web API call.

In step 410, the Web API which corresponds to the user annotated Web API is invoked on a web service which uses the API. Once the result is received from the web service, the chatbot displays the result either unmodified as received or translated to a form which is more natural for the user, i.e. translated to a natural language (NL) form. For example, "This loan is validated, the monthly repayment amount is $550."

In one preferred implementation, BERT fine-tuned with SQuAD is used as the QA System, but any QA system can be used. BERT stands for Bidirectional Encoder Representations from Transformations; SQuAD is the Stanford Question Answering Dataset. Any goal-based reasoning engine can be used providing that its rule set can be generated from the annotated web specification (see step 304)

The following provides some examples of the steps outlined above. These examples are not meant to be limiting, but illustrative of preferred embodiments in which the invention may be embodied.

An example of annotations (in bold) provided by the user on a Web APIs specification containing two Web APIs follows. For example, the user annotates a first section of the Web API with a description ("description": "can send email") describing an API call and a set of questions (e.g., ""question": "to whom the email is sent?") which detail other parameters needed to execute the call. These parameters can be found in the user input already entered in the dialog or can be obtained by additional queries to the user for clarification. As is shown in preferred embodiments, the description and question can be indicated by appropriate tags in the annotation.

```
{
  "actions": [
    {
      "description": "can send email",
      "url": "https://fyre.com/api/v1/tasks/
        5e4a6539c0caab007f1156bb/runs",
      "input_schema": {
        "$schema": "http://json-schema.org/
          draft-07/schema#",
        "type": "object",
        "properties": {
          "to": {
            "type": "string",
            "question": "to whom the email
              is sent?"
          },
          "message": {
            "type": "string",
            "question": "what is the message
              of the email?"
          }
        },
        "required": [
          "message",
          "to"
        ]
      }
    },
    {
      "description": "can validate loan",
      "url": "https://fyre.com/api/v1/tasks/
        5e60d2ad11cb4f007e9c69bd/runs",
      "input_schema": {
        "$schema": "https://json-schema.org/
          draft-07/schema#",
        "type": "object",
        "properties": {
          "name": {
            "type": "string",
            "question": "what is the name of
              the client?"
          },
          "amount": {
            "type": "integer",
            "question": "what is the amount
              of the loan?"
          },
          "duration": {
            "type": "integer",
            "question": "how many months
              does the loan last?"
          }
        },
        "required": [
          "name",
          "amount",
          "duration"
        ]
      }
    }
  ]
}
```

In some embodiments, the above annotations are inserted directly into the specification by skilled users, e.g., programmers. Though a typical Web API specification is very technical (it is a JSON payload), the annotations (description and questions in bold) are not. To improve the ease of use for non-programmers, some embodiments provide a user interface which hides the complexity of the underlying JSON structure to allow less skilled users to add description and questions for each Web API.

An example of lines in an action catalog automatically generated in step 303 from the above annotated Web APIs specification is displayed below.

The action 1 can send email.
The action 2 can validate a loan.

An example of a rule set automatically generated from the annotated Web APIs specification in step 304 is shown below.

```
concept CallAction1( );
concept To_1(?value : string);
concept Message_1(?value : string);
concept CallAction2( );
concept Name_2(?value : string);
concept Amount_2(?value : string);
concept Duration_2(?value : string);
rule {
  To_1(?value1);
  Message_1(?value2);
} -> {
  CallAction1( );
};
rule {
  Name_2(?value1);
  Amount_2(?value2);
  Duration_2(?value3);
} -> {
  CallAction2( );
};
concept To_1 {
  question(?) = "to whom the email
    is sent?";
}
concept Message_1 {
```

```
    question(?) = "what is the message
    of the email?";
}
concept Name_2 {
    question(?) = "what is the name of
    the client?";
}
concept Amount_2 {
    question(?) = "what is the amount of
    the loan?";
}
concept Duration_2 {
    question(?) = "how many months
    does the loan last?";
}
```

Note that goal CallActionX( ) used in the rules refer to the action X in the action catalog.

Referring now to FIG. 4, the following provides some examples of the steps outlined above. These examples are not meant to be limiting, but illustrative of preferred embodiments in which the invention may be embodied.

An example of user request which might be received in step 401 is as follows: "Can you validate a $100000 loan for John Smith?"

An example of action detection in step 402 performed by a question answering system is shown below with the action catalog as text to understand and the above user request slightly reformulated as question.
TEXT: The action 1 can send email. The action 2 can validate loan.
QUESTION: Which action can validate a 100000$ loan for john smith?
ANSWER: action 2
confidence_sum=12.306931495666504
confidence_entropy=0.8452514701844971
The bold values are the output (answer and confidence scores) of the QA system.

An example of retrieving questions to get the input values with a goal-based reasoning engine in step 405 is shown below: In this example, the action 2 (previously identified above) refers to the concept goal CallAction2( ) above. Therefore, the CallAction2( ) is set as the goal in the goal-based reasoning engine. The reasoning engine uses backward chaining reasoning to determine missing facts to reach that goal. Here those determined missing facts are:
Name_2(?value1);
Amount_2(?value2);
Duration_2(?value3);

When missing facts are identified, the missing facts are sent as questions in step 406 to the NLU engine, i.e., the QA system. The following are representative questions:
What is the name of the client?
What is the amount of the loan?
How many months does the loan last?

Also, in step 406, input value detection is performed. An example of input value detection done by a question answering system with the user request as text (reformulated as a statement):
TEXT: The action can validate a $100000 loan for john smith.
QUESTION: what is the name of the client?
ANSWER: john smith
confidence_sum=11.982032299041748
confidence_entropy=0.9873534438628503
TEXT: The action can validate a 100000$ loan for john smith.
QUESTION: what is the amount of the loan?
ANSWER: $100000
confidence_sum=16.030826091766357
confidence_entropy=0.9759557637007954
TEXT: The action can validate a 100000$ loan for john smith.
QUESTION: how many months does the loan last?
ANSWER:_unknown_
confidence_sum=−0.388225555419922
confidence_entropy=0.1138238865917142

An example of a conversation between a user and a chatbot performing the actions from step 401 to step 410 of FIG. 4 is displayed in FIG. 5. In the dialog panel 501, the user inputs are denoted by "user" and the system responses are denoted by "system". The dialog shown concerns an interaction between the user and chat bot when validating a loan. The user input 503 corresponds to step 401. The system response 505 corresponds to step 408 where the system asks questions of the user to acquire missing input parameters. The system response 507 corresponds to the user confirmation step 409 in FIG. 4. Finally, the system response 509 shown in FIG. 5 corresponds to a successful invocation of the Web API in step 410 in FIG. 4.

Figure 6:
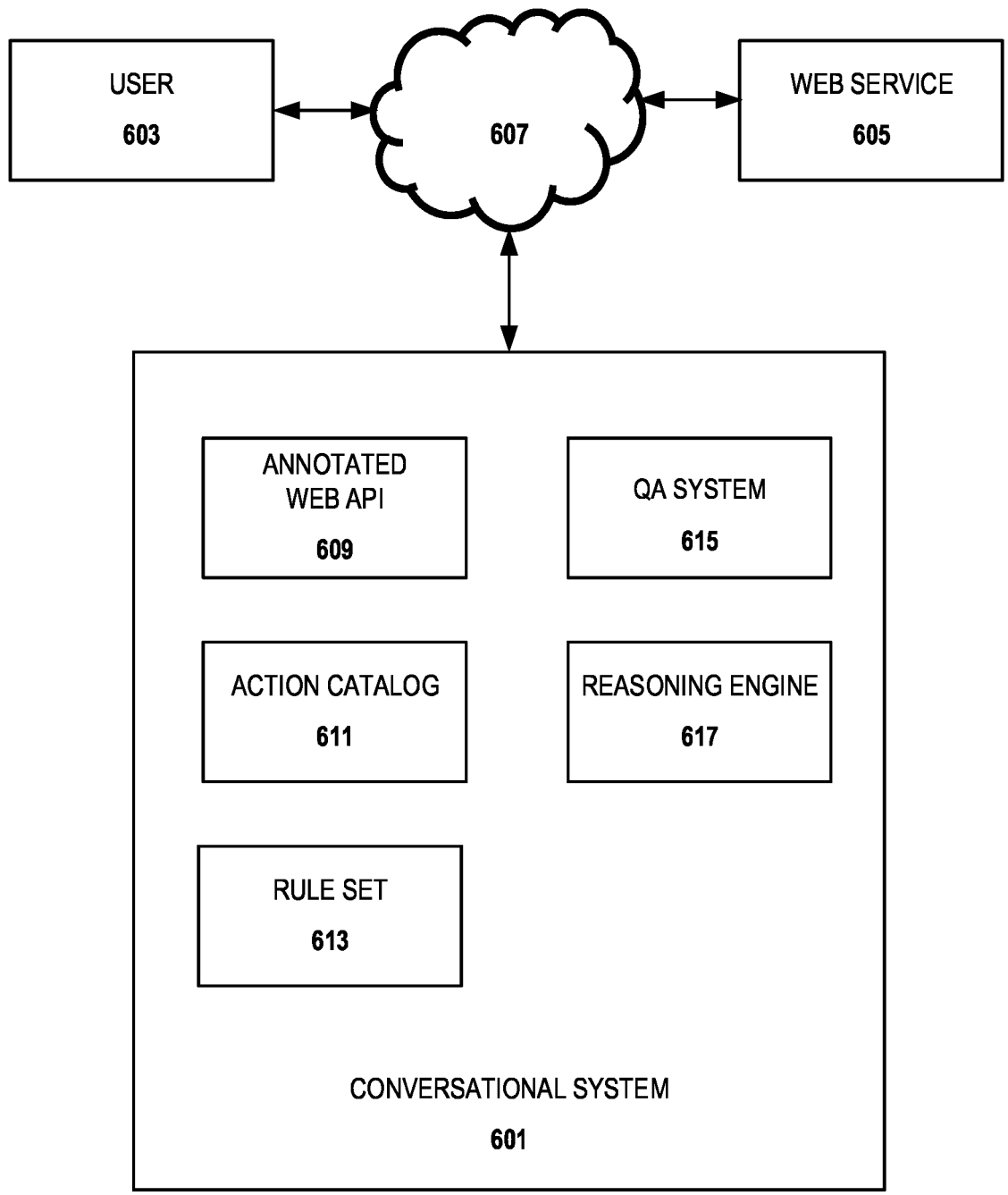
FIG. 6 is a system architecture diagram for one embodiment of the invention.

FIG. 6 is a system architecture diagram for one embodiment of the invention. The conversational system 601 communicates with user system 603 and Web service 605 via a network 607 such as the internet. Although the conversational system 601 and web service 605 are shown as resident on separate systems, in other embodiments they can be collocated on the same system.

As is discussed above, the user annotated Web API 609 is received from the user 603. The conversational system then derives the action catalog 611 and the rule set 613 from the user annotated Web API 609. The QA system 615 receives and interprets user input from the user system 603 to identify an appropriate action in the action catalog 611. The identified action is set as a goal for the goal-based reasoning engine 617. The goal based reasoning engine 617 establishes which inputs are needed to successfully call a Web API call corresponding to the identified action. The goal based reasoning engine 617 interacts with the user system 603 and the QA system 615 to supply the needed inputs. Once the inputs are gathered and confirmed by the user, the conversational system 601 makes the web API call to the web service system 605 using the supplied information.

Embodiments of the invention display such a chatbot user interface. A primary advantage of the present invention is the ease in configuring the chat bot application. Although the description above describes some preferred embodiments, it can be used in a variety of conversational systems. Although a Web API specification is described in a preferred embodiment, other API specifications used for performing actions on behalf of the user may be used in alternative embodiments.

This invention brings several advantages over existing system. Conversational systems which implement embodiments are easier to setup. The requirement to annotate a Web API specification with simple information (questions and description) is easier than defining entities and intent detection training set. It does not require the user to follow strict naming conventions which are typical in Web API specifications. Arguably, this setup requires little to no technical skill enabling a wider range of users to create a chatbot. Further, chatbots created according to embodiments of the invention offer better user experience. Input is better extracted from user requests and thus limits the number of system questions asked of the chatbot user.

The order of steps in which the method is described is not intended to be construed as a limitation, and any number of the described method blocks may be combined in any order to implement the method, or an alternate method. Additionally, individual blocks may be deleted from the method without departing from the spirit and scope of the embodiments of the invention.

One skilled in the art will understand that the division of tasks between the modules is exemplary, and that other embodiments of the invention will divide the tasks differently. Further, in describing exemplary processes below, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for creating a conversational system comprising:
  receiving a user annotated Web API specification including a set of user annotations;
  analyzing the user annotated Web API specification to produce an action catalog, the action catalog including a set of sentences, each sentence describing a respective Web API call;
  analyzing the user annotated Web API specification to produce a rule set, each rule in the rule set having a rule condition which corresponds to an input in the user annotated Web API specification; and
  providing the action catalog and the rule set to the conversational system, wherein the conversational system uses a question answering (QA) system as a natural language understanding (NLU) component.

2. The method as recited in claim 1, wherein the set of user annotations comprise a set of questions and a set of descriptions, each description for at least a part of user annotated Web API specification and each question for an input of a Web API call from the user annotated Web API.

3. The method as recited in claim 1, further comprising:
receiving a user input by the conversational system during a dialog between a user and the conversational system;
interpreting the user input by the QA system to identify an action from the action catalog; and
determining a confidence score for the identified action.

4. The method as recited in claim 3, further comprising retrieving a set of questions for a Web API call corresponding to the identified action to obtain the input values for the Web API call.

5. The method as recited in claim 1, wherein the rule set is interpreted by a goal-based reasoning engine.

6. The method as recited in claim 1, wherein each rule condition is for a respective Web API call in the user annotated specification.

7. The method as recited in claim 6, wherein a respective rule condition corresponds to an input of the user annotated Web API specification.

8. The method as recited in claim 1, further comprising:
receiving a user request in a natural language (NL) during a dialog between a user and the conversational system;
identifying an action in the user request in the action catalog;
setting a goal for a goal-based reasoning engine as the identified action;
analyzing a response of the question answering system for conformance to an expected format and set of inputs needed by the goal-based reasoning engine; and
issuing questions to the user to supply missing information for the set of inputs.

9. Apparatus, comprising:
a processor;
computer memory holding computer program instructions executed by the processor for operating a conversational system, the computer program instructions comprising:
program code, operative to receive a user input by the conversational system during a dialog between a user and the conversational system;
program code, operative to interpret the user input by a question answering (QA) system to identify an action from an action catalog, the action catalog produced from a user annotated Web API specification and including a set of sentences, each sentence describing a respective Web API call;
program code, operative to set a goal for a goal-based reasoning engine as the identified action; and
program code, operative to issue a response to the user based on the identified action and results from the goal-based reasoning engine.

10. The apparatus as recited in claim 9, further comprising:
program code, operative to receive a user annotated Web API specification including a set of user annotations;
program code, operative to analyze the user annotated Web API specification to produce an action catalog, the action catalog including a set of sentences, each sentence describing a respective Web API call;
program code, operative to analyze the user annotated Web API specification to produce a rule set, each rule in the rule set having a rule condition which corresponds to an input in the user annotated Web API specification; and
program code, operative to provide the action catalog and the rule set to the conversational system, wherein the conversational system uses a question answering (QA) system as a natural language understanding (NLU) component.

11. The apparatus as recited in claim 10, further comprising program code, operative to determine a confidence score for the identified action.

12. The apparatus as recited in claim 9, wherein the goal-based reasoning engine serves the conversational system as a dialog driver, the apparatus further comprising program code, operative to interpret a rule set, each rule in the rule set having a rule condition which corresponds to an input in the user annotated Web API specification.

13. The apparatus as recited in claim 12, further comprising:
program code, operative to analyze a response of the question answering system for conformance to an expected format and set of inputs needed by the goal-based reasoning engine; and
program code, operative to issue questions to the user to supply missing information for the set of inputs.

14. The apparatus as recited in claim 9, further comprising:
program code, operative to invoke a Web API on a web service, the Web API corresponding to the user annotated Web API; and
program code, operative to translate a result received from the web service to a natural language (NL) form.

15. A computer program product in a non-transitory computer readable medium for use in a data processing system, the computer program product holding computer program instructions executed by the data processing system for operating a conversational system, the computer program instructions comprising:
program code, operative to receive a user input by the conversational system during a dialog between a user and the conversational system;
program code, operative to interpret the user input by a question answering (QA) system to identify an action from an action catalog, the action catalog produced from a user annotated Web API specification and including a set of sentences, each sentence describing a respective Web API call;
program code, operative to set a goal for a goal-based reasoning engine as the identified action; and
program code, operative to issue a response to the user based on the identified action and results from the goal-based reasoning engine.

16. The computer program product as recited in claim 15, further comprising:
program code, operative to receive a user annotated Web API specification including a set of user annotations;
program code, operative to analyze the user annotated Web API specification to produce an action catalog, the action catalog including a set of sentences, each sentence describing a respective Web API call;
program code, operative to analyze the user annotated Web API specification to produce a rule set, each rule in the rule set having a rule condition which corresponds to an input in the user annotated Web API specification; and
program code, operative to provide the action catalog and the rule set to the conversational system, wherein the conversational system uses a question answering (QA) system as a natural language understanding (NLU) component.

17. The computer program product as recited in claim 15, further comprising program code, operative to operate a goal-based reasoning engine which interprets a rule set, each rule in the rule set having a rule condition which corresponds to an input in the user annotated Web API specification.

18. The computer program product as recited in claim 16, wherein the user annotated Web API specification contains an annotation for a description of a Web API function and a set of annotations for needed inputs of Web API in a natural language.

19. The computer program product as recited in claim 15, further comprising program code, responsive to a failure to identify an action in the action catalog to request that the user rephrase the question or to provide more information to identify an action in the action catalog.

20. The computer program product as recited in claim 15, wherein the goal-based reasoning engine is an inference engine that works in a backward chaining process.

* * * * *